(12) United States Patent
Vestergaard Frandsen et al.

(10) Patent No.: US 12,377,643 B2
(45) Date of Patent: Aug. 5, 2025

(54) HERMETIC, INSECTICIDAL FOOD STORAGE BAG, USE OF IT AND A METHOD FOR ITS PRODUCTION

(71) Applicant: VESTERGAARD SÀRL, Lausanne (CH)

(72) Inventors: Mikkel Vestergaard Frandsen, Tiburon, CA (US); Thomas Weis, Les Monts-de-Corsier (CH); Allan Mortensen, Lausanne (CH)

(73) Assignee: VESTERGAARD SÀRL, Lausanne (CH)

( * ) Notice: Subject to any disclaimer, the term of this patent is extended or adjusted under 35 U.S.C. 154(b) by 0 days.

(21) Appl. No.: 18/765,964

(22) Filed: Jul. 8, 2024

(65) Prior Publication Data
US 2024/0359441 A1    Oct. 31, 2024

Related U.S. Application Data

(62) Division of application No. 16/765,891, filed as application No. PCT/EP2017/079877 on Nov. 21, 2017, now abandoned.

(51) Int. Cl.
*B65D 30/08* (2006.01)
*A01N 25/10* (2006.01)
(Continued)

(52) U.S. Cl.
CPC .............. *B32B 27/08* (2013.01); *A01N 25/10* (2013.01); *B31B 70/10* (2017.08); *B31B 70/16* (2017.08); *B31B 70/79* (2017.08); *B32B 5/024* (2013.01); *B32B 27/12* (2013.01); *B32B 27/306* (2013.01); *B32B 27/32* (2013.01); *B32B 37/15* (2013.01);
(Continued)

(58) Field of Classification Search
CPC .............. B31B 70/16; B31B 2155/003; B31B 2160/10; B32B 37/15; B32B 2307/7244; B32B 2307/764; B65D 29/02; B65D 65/42; B65D 81/28
See application file for complete search history.

(56) References Cited

U.S. PATENT DOCUMENTS 3,771,254 A    11/1973    Scott
3,859,121 A    1/1975    Veadon
(Continued)

FOREIGN PATENT DOCUMENTS

CA    2422739 A    4/2002
CN    107010311 A    8/2017
(Continued)

OTHER PUBLICATIONS

Oxygen Transmission Rate, 2023, PolyPrint, pp. 1-7 (Year: 2023).*
(Continued)

*Primary Examiner* — Veronica Martin
(74) *Attorney, Agent, or Firm* — Cermak & McGowan LLP; James Creighton Wray; Malcolm K. McGowan

(57) ABSTRACT

A crop storage bag (1) made is of a high-strength textile (7) material which is extrusion-coated or laminated with a multilayer film (8) that comprises an insecticidal layer (9) in addition to a hermetic layer (10) which prevents oxygen from entering the bag. This oxygen barrier suffocates the insects inside the bag, and the insecticide kills insects that try to bore through the bag.

8 Claims, 3 Drawing Sheets

(51) Int. Cl.
  *B31B 70/10* (2017.01)
  *B31B 70/16* (2017.01)
  *B31B 70/60* (2017.01)
  *B31B 70/74* (2017.01)
  *B31B 150/00* (2017.01)
  *B31B 155/00* (2017.01)
  *B31B 160/10* (2017.01)
  *B32B 5/02* (2006.01)
  *B32B 27/08* (2006.01)
  *B32B 27/12* (2006.01)
  *B32B 27/30* (2006.01)
  *B32B 27/32* (2006.01)
  *B32B 37/15* (2006.01)
  *B65D 65/42* (2006.01)
  *B65D 81/28* (2006.01)

(52) U.S. Cl.
  CPC ............ *B65D 29/02* (2013.01); *B65D 65/42* (2013.01); *B65D 81/28* (2013.01); *B31B 70/61* (2017.08); *B31B 70/76* (2017.08); *B31B 2150/003* (2017.08); *B31B 2155/003* (2017.08); *B31B 2160/10* (2017.08); *B32B 2307/7244* (2013.01); *B32B 2307/764* (2013.01); *B32B 2323/04* (2013.01); *B32B 2329/04* (2013.01); *B32B 2439/46* (2013.01)

(56) References Cited

U.S. PATENT DOCUMENTS

| | | |
|---|---|---|
| 4,643,119 A | 2/1987 | Langston et al. |
| 4,743,448 A | 5/1988 | Bahadir et al. |
| 4,884,958 A | 12/1989 | Chapman et al. |
| 4,966,796 A | 10/1990 | Aki |
| 6,063,418 A | 5/2000 | Sugimoto |
| 8,528,305 B2 | 9/2013 | Villers |
| 2011/0082019 A1* | 4/2011 | Bannister ................ A45C 3/04 493/269 |
| 2011/0187028 A1 | 8/2011 | Menning et al. |
| 2014/0037706 A1* | 2/2014 | Bagwell .................. B29D 7/01 424/409 |
| 2014/0134223 A1* | 5/2014 | Dove ..................... B65D 81/28 424/405 |

FOREIGN PATENT DOCUMENTS

| | | |
|---|---|---|
| EP | 0382382 A1 | 8/1990 |
| EP | 1325070 A1 | 7/2003 |
| EP | 1325070 B1 | 11/2008 |
| GB | 1568936 A | 6/1980 |
| WO | WO99/09824 A1 | 3/1999 |
| WO | WO2016/062496 A1 | 4/2016 |

OTHER PUBLICATIONS

Oxygen Transmission Rate, 2023, PolyPrint, 1-7 (Year: 2023).
Communication Pursuant To Article 94(3) EPC from European Patent App. No. 17801043.5 (Nov. 3, 2022) with annex.

* cited by examiner

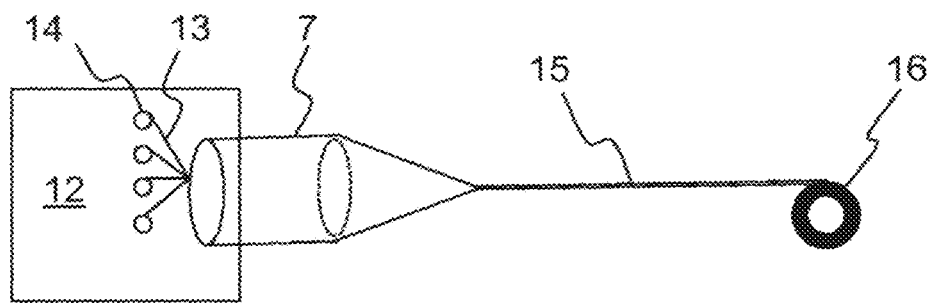
FIG. 2
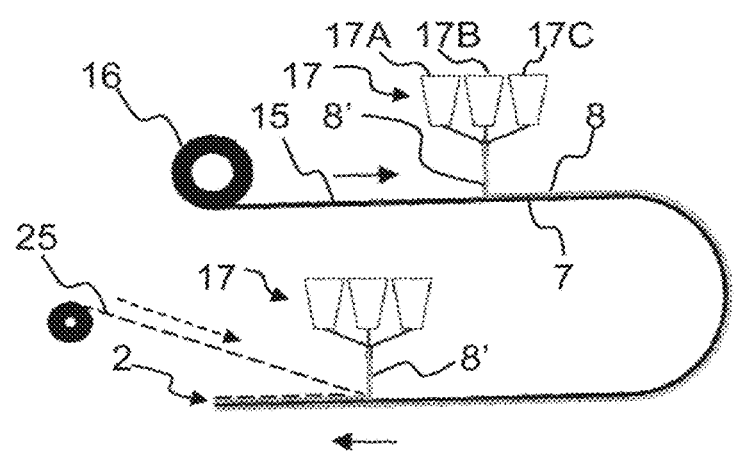
FIG. 3
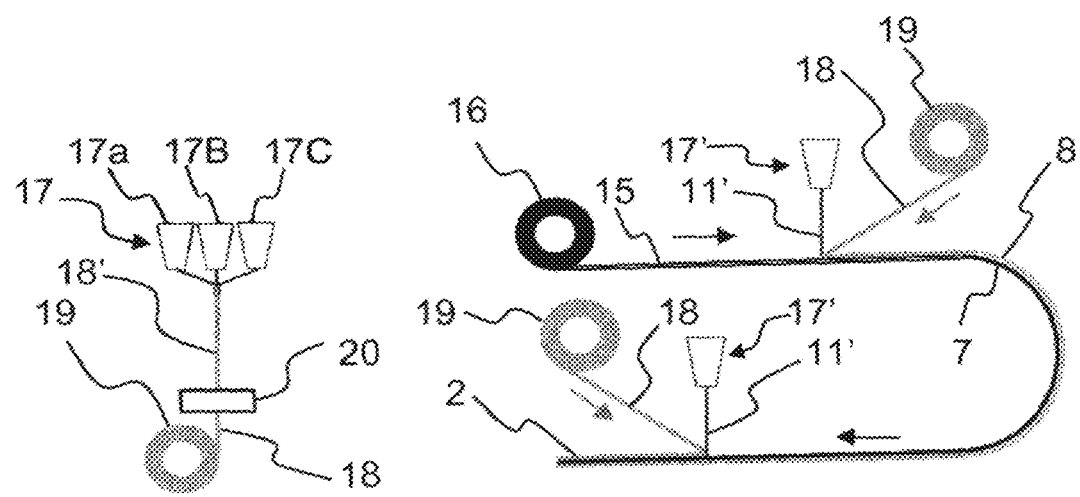
FIG. 4a
FIG. 4b

HERMETIC, INSECTICIDAL FOOD STORAGE BAG, USE OF IT AND A METHOD FOR ITS PRODUCTION

CROSS-REFERENCE TO RELATED APPLICATIONS

This application is a divisional of U.S. application Ser. No. 16/765,891, filed 21 May 2020, which is a national stage entry under 35 USC 371 of PCT/EP2017/079877, filed 21 Nov. 2017. The contents of these priority applications are incorporated herein by reference in their entirety.

FIELD OF THE INVENTION

The present invention relates to a hermetic, insecticidal food storage bag, use of it and a method for its production. For example, the bag is used for post-harvest crop storage, especially in the form of sacks.

BACKGROUND OF THE INVENTION

Crop infestation by insects and fungi is a widespread problem, especially during storage of the crop in sacks. Therefore, pesticides are sometimes used during storage, for example by directly treating grains in sacks, for example by using fumigation. However, consumption of pesticides may imply a health hazard for the consumer.

Accordingly, it has become customary to treat the material of the storage sacks, thereby targeting the insects trying to enter through the sack material. For example, U.S. Pat. No. 3,859,121 by Yeaden discloses impregnated textile bags for the storage and transport of food and feed, like grains, and U.S. Pat. No. 4,966,796 by Sumitomo discloses a kraft paper grain storage bag with pyrethroid for protection of grains. European patent application EP382382 by Imperial Chemical discloses impregnated woven or nonwoven fabric, for example as sacks for foodstuff.

Multilayer material is discussed in British patent application GB1568936 by Heselev, disclosing packaging material for food, for example brown rice, where insecticide is incorporated in a polymer film, for example part of a laminate.

US2014/0037706 by ProvisionGard Holding discloses a packaging structure for human and animal food, for example a bag for grain storage or dog food. The packaging structure comprises a film that contains a pest control agent, for example juvenile hormones, and which is coated onto a polymer weave, for example in order to prevent insects boring through the material. The layer with the active agent can be on the inside or the outside of the bag. Coating is potentially done by extrusion. For example, the packaging material comprises a polypropylene (PP) film on a PP weave. As outer film layer, 0.7 mm oriented polypropylene (OPP) is disclosed, covering a layer if Linear Low Density Polyethylene (LLDPE) with a pest control agent (containing hormones) on top of a PP weave. The pest control agent can be added directly to the extruder.

EP1325070 by Proctor & Gamble discloses extrusion-coating a hydrophilic, vapor permeable, water impermeable, film-layer onto a substrate, for example a textile or fabric substrate. Insecticide is mentioned as an option for an active agent in the film. A possible use is for food packaging or article for agriculture.

However, if the inner side of the sacks is also containing insecticide, this may diffuse into the stored crop. As pointed out in U.S. Pat. No. 4,743,448, multilayer containers are better suited if the material is for human consumption, as the innermost layer can be made free from the active substance. This strategy is followed in U.S. Pat. No. 3,771,254, disclosing a food storage bag for vegetables and fruits, for example dried beans, with insecticide coated or impregnated on the outside of the bag. Another example is WO99/09824 by CryoVac, disclosing paperboard or paper as a food packaging material, for example comprising insecticide (page 12 line 2), on an outer layer (page 12 line 26), extrusion-coated (page 12 line 15).

This strategy of preventing contact of insecticide with the foodstuff is followed in international patent application WO2016/062496 by Shah and Dove and assigned to A to Z Textile Mills Ltd, where a film bag is made of multiple layers. The multiple layers of the film bag comprise an airtight layer, an insect barrier layer comprising an insecticide or insect repellent, and a chemical barrier layer for limiting permeation of the insecticide or insect repellent through the chemical barrier layer into the crop inside the bag. This way, the grains inside the bag are not exposed to the insecticide. The airtight layer has the effect of killing the insects by suffocation, which has the further significant effect of helping to delay the onset of resistance to the insecticide or insect repellent. As a further advantage, the low oxygen levels within the airtight bag can also prevent or slow down the growth of mold. When an insect attempts to penetrate the storage bag, it penetrates the chemical barrier layer and comes into contact with the insecticide or insect repellent. The film bag optionally inserted into an outer robust bag, potentially containing a rodent repellent.

The idea of using a hermetic inner bag within a high-strength outer bag, where the inner bag is used for suffocation instead of using insecticides is disclosed in U.S. Pat. No. 8,528,305 by Grainpro Inc.

Purdue University has published studies on crop storage bags called Purdue Improved Crop Storage (PICS) bags which is also subject to various reports and articles, which can be found on the Internet, including Wikipedia and the Purdue internet site https://www.entm.purdue.edu/PICS2/projectoverview.php, both of which contain various literature references. A PICS bag has a size for 50-100 kg grains and consists of two layers of 80 micron thick polyethylene liners and a third layer made from woven polypropylene. When each layer is tied and closed separately, it creates a hermetically sealed environment for storing harvested grain.

In the above-mentioned WO2016/062496 by A to Z Textile Mills Ltd, oxygen transmission rates, OTR, are disclosed for the bag by GrainPro (4.28 ccm/m2/day) and for a single layer PICS bag (490 ccm/m2/day).

Suffocation is also discussed in U.S. Pat. No. 6,063,418 by Sugimoto et al. and assigned to Fujimori Kogyo Ltd, disclosing a container with an outer high-strength PP 1,500 deniers flat yarn woven bag, which contains an inner bag that has a low $CO_2$ permeation level, suitable for being filled with $CO_2$ for suffocating the insects inside the inner bag. An example of the inner bag is a five-layer structure of a 10 micron thick EVOH layer sandwiched between two 5 micron thick adhesive layers and two 30 micron thick LLDPE layers.

There appears to be multiple principles of crop storage bags, wherein the main principles are: insecticidal multilayer films, woven fabrics impregnated with insecticides, woven fabrics coated with an insecticidal film, a double sack structure with an inner multilayer hermetic sack, with or without insecticide, and an outer robust sack.

Although, the latter double sack principle appears an attractive technical solution, the high production costs have prevented commercial success. It would be desirable to provide sacks at a lower cost with similar benefits.

Also, rodents are a severe problem for crop storage because rodents damage the sacks for storage when biting through the material. For this reason, a variety of substances have been proposed for protection of crops, including castor oil, capsaicin, and denatonium saccharide.

Due to large losses of foodstuff, there is a general interest in improved crop storage and various attempts have been tried. However, there is still a need for improvements. Therefore, it would be desirable to find technical solutions for improving crop storage, especially storage of grains.

DESCRIPTION/SUMMARY OF THE INVENTION

It is therefore an objective of the invention to provide an improvement in the art. In particular, it is an objective to provide an improved storage bag for foodstuff, especially post-harvest crops, such as grains. An objective is a low-cost, light-weight food storage bag which provides an efficient barrier against insects that are trying to enter the bag from outside and which, at the same time, prevents breeding inside the storage bag by insects from pre-infestation, potentially even kills the insects inside the bag.

This objective is achieved by a bag as set forth in the following. The bag is especially useful for crop storage, for example storage of grains. A typical form of the bag is a flexible sack of a size typically used for grain storage, for example for a weight in the range of 20-100 kg. However, the method and principles set forth in the following can also be used for a flexible large scale transport bag for storage of larger quantities, for example in the range of 100-2000 kg.

The general principle of the invention is to provide a textile bag made of a textile material, typically high-strength textile material, which is extrusion-coated or laminated with a multilayer film that comprises insecticide in addition to a hermetic layer that prevents oxygen from entering the bag, as permeation of oxygen through the multilayer film is prevented. This oxygen barrier suffocates and/or dehydrates the insects inside the bag, and the insecticide kills insects that try to bore through the bag from the outside.

The term "extrusion-coating" is understood as a coating of the textile by attaching a molten multilayer polymer stream directly onto the textile surface and then solidifying the multilayer stream to become a multilayer film.

The term "lamination" is herein understood as a prefabricated multilayer film that is bonded onto the textile, typically by a molten bonding polymer between the textile and the multilayer film.

The terms "insects" is used herein for simplicity in a broad sense, covering various arthropods in connection with infection of foodstuff, especially crops, such as grain. Accordingly, the term "insect" should be understood as not limited to the Insecta class but also other arthropod classes, especially Arachnida, of which particular interest has the sub-class Acari, which contains mites. In relation to foodstuff protection, also lice are included in the term "insect".

The term "insecticide" should thus also be understood in a general sense for not only killing insects but also killing acaricides.

The term "insect repellent" is to be understood as repelling insects, including acari and lice, but not killing them. Thus, the insects are able to stay alive and move away when exposed to the insect repellent.

The following abbreviations are used:
PE—PolyEthylene, this term is broad and includes LDPE, LLDPE, HDPE
LDPE—Low Density PolyEthylene
LLDPE—Linear Low Density PolyEthylene
HDPE—High Density PolyEthylene
PP—Polypropylene
PA—PolyAmide
PET—PolyEthylene Terephthalate (Polyester)
EVOH—Ethylene Vinyl alcohol
ccm—cubic centimeter
m2—square meter
μm—micron
OTR—Oxygen Transmission Rate (OTR and permeability values are given for atmospheric pressure)
DM—deltamethrin
PBO—piperonyl butoxide
CO2—carbon dioxide In particular, a hermetic insecticidal crop storage textile bag is provided with an inner side facing an inner volume and an opposite outer side facing the environment, wherein the bag comprises a textile sheet forming the bag with an outer side covered with a polymer multilayer film provided by extrusion-coating or lamination onto the textile.

The multilayer film comprises an insecticidal layer of a first thermoplastic polymer containing an active agent, which is at least one of insecticide and insect repellent, for preventing intrusion of insects into the bag by the insecticidal layer. Furthermore, the multilayer film also comprises an oxygen barrier layer made of a second thermoplastic polymer, wherein the oxygen barrier layer has an oxygen permeability sufficiently low for preventing breeding of potential insects inside the bag, and preferably killing potential insects inside the bag.

For example, the term oxygen barrier is used for a polymer layer that has an oxygen permeability of less than 100 ccm/m2/day per 25 microns thickness layer (25 μm≈1 mil). For example, the oxygen permeability of the oxygen barrier is less than 60 ccm/m2/25 μm/day or even less than 1 ccm/m2/25 μm/day, the latter being fulfilled by EVOH.

For example, polyamide (PA) film has a permeability of 40 ccm/m2/day, which implies that a PA film with a thickness of 25 microns has an OTR of 40 ccm per square meter of the foil per day. A PET film has a permeability of 55 ccm/m2/day, which implies that a PET film with a thickness of 25 microns has an OTR of 55 ccm per square meter of the foil per day. Ethylene vinyl alcohol, EVOH, has a permeability of 0.3 ccm/m2/25 μm/day, which is two orders of magnitude lower. In comparison, the oxygen permeability in the same units for PP and HDPE is 2325 and for LLDPE as high as 6800. (Source: DuPont—Typical Density and Barrier Properties).

The much higher permeability of PP and PE would require a much thicker material in order to function as an efficient oxygen barrier, which increases weight and, typically, also costs and even makes the material difficult to handle due to stiffness.

Due to the two orders of magnitude differences between the oxygen permeabilities for the first group of polymers EVOH, PA and PET and the oxygen permeabilities for the second group of polymers PP and PE, including HDPE, LDPE, and LLDPE, the first group is regarded as oxygen barrier materials, whereas the second group is not.

For the initially mentioned PICS double bags, the thickness of each being 80 microns, the total thickness of 160 microns HDPE corresponds roughly to an OTR of 360. In WO2016/06296, the OTR for a single layer PICS bag was measured to 490 ccm/m2/day. A double layer would correspond to half of that, yielding 245 ccm/m2/day. From the reports of prevented breeding for a single PICS and expectedly better killing effect for a double layer PICS bag, it is reasonable to assume that a killing effect and proper effect against breeding is obtained for an OTR of less than 300 ccm/m2/day. This accounts for bags with a size in the range of 20-100 kg.

When comparing with the above permeabilities, an OTR of less than 300 ccm/m2/day is obtained with a PA or PET layer having a thickness of less than 4 or 5 microns, respectively. An oxygen barrier of PA or PET with a thickness of 5 microns appears sufficient from this perspective. Also, the oxygen barrier layer thickness of 5 microns is advantageous for low weight while still being sufficiently stable during co-extrusion.

In order to provide a flexible light-weight bag, it is preferred that the multilayer film is thinner than the 80 microns that are used for the PICS bags that were described above. This is especially so because the multilayer film is combined with the textile, which adds to the stiffness of the bag. For example, the multilayer film has a maximum thickness of only 50 microns. As will be discussed later, experiments were made with multilayer films thinner than this. However, in order to achieve a low OTR, a layer of a polymer suitable as oxygen barrier is added to the multilayer film.

Optionally, the insecticidal polymer has a greater layer thickness than the oxygen barrier, especially, if the oxygen barrier is EVOH, as this is the most efficient oxygen barrier material among the above polymers.

It should be pointed out that the thickness of an EVOH oxygen barrier, typically, is much less than 25 microns. In experiments, the thickness of the EVOH layer was 5 microns, which was found fully sufficient for barrier properties of a typical sack for grain storage as well as for larger bag-containers. Depending on the size of the bag relatively to its volume, higher OTR can be acceptable. If a suitable limit for the OTR is less than 100 ccm/m2/day, a 25 micron layer of PET or PA would be sufficient. If the criteria is an OTR of less than 50 ccm/m2/day, a PA layer of 25 microns with an OTR of 40 ccm/m2/day would suffice for this purpose as well as a PA layer of 30 microns.

PET is not advantageous over EVOH with respect to oxygen permeability and weight, however, when using a PET fabric, a PET layer in the extrusion-coated film, where the PET layer is facing the PET fabric, has advantages with respect to binding without the need of bonding layers, in contrast to PA, PE, and PP, which typically need a bonding layer in order to get attached to a PET textile. In addition, PET material has a substantial cost advantage over EVOH and also over PA. Furthermore, the low cost and easy access to PET through PET recycling may favor use of PET in the multilayer, especially when the textile is also made of PET, even though the weight as compared to a multilayer with only EVOH as the barrier would increase. In case where the oxygen barrier properties of PET or PA are not found sufficient, when taking into regard the weight criteria, a combination with EVOH in the multilayer is an option. By using a bonding layer on the PET layer, the insecticidal layer can be of different polymer, for example PP or PE, optionally LDPE or LLDPE.

The insecticidal film is provided on the outer side of the textile in order to kill insects before they bore a way through the textile. A further advantage for the film only being on the outer side of the textile is a simple and low-cost production. The latter is valid, especially, if the textile is provided as a seamless tube of textile that is subsequently coated.

In some practical embodiments, the textile is provided as an endless textile web, for example woven using thin polymer flat tapes as yarns, optionally PP, HDPE, or PET yarns. Typical widths of the flat tapes are in the range of 2-4 mm for storage sacks and in the range of 3-6 mm for big-bags.

The weaving for a textile web is normally done in a circular loom, which produces an endless tubular textile web. By providing the textile as a closed tube, especially woven tube, no seaming is needed along the web, which simplifies the production method. Also, the lack of longitudinal seam along the web results in higher strength, which, in turn, allows a thinner material to be used. This reduces weight and costs of the textile. In this case, the crop storage bag comprises a tubular polymer textile with a seam only at the bottom or comprises a seam only at the bottom as well as at the top, once both ends of the bag are closed with such seams.

For example, the tubular textile web is flattened into a flat two-layer textile web with two opposite outer sides, and the web is rolled onto rollers. In some embodiments, the flattened web is then later unrolled from the roller and laminated with a multilayer film covering the textile surface. In other embodiments, the flattened textile is extrusion-coated with a molten multilayer polymer stream that solidifies into a multilayer film, once on the textile.

As compared to the prior art hermetic liner bag inside an outer high-strength textile bag, the advantages of the production as described herein are higher production speed, simpler production, less consumption of material, lower cost, lower weight, easier transport and easier handling by the end user.

The bag combines the principle of an insecticidal barrier against intruding insect with the principle of hermetic suffocation and/or dehydration of the insects inside the bag. This way, breeding is prevented and advantageously, the insects are killed. Due to the low cost and low weight in combination with an efficient crop protection, the bag is highly suitable for crop protection in countries where low cost is essential for selection of post-harvest crop protection.

Typically, the second thermoplastic polymer for the oxygen barrier is different from the first thermoplastic polymer for the insecticidal layer, for example as described above for the EVOH, PET or PA barrier layer combination with PP or PE insecticidal layer. Advantageously, the multilayer film with the oxygen barrier is provided between the textile web and the insecticidal first polymer layer for protecting the oxygen barrier by the insecticidal first polymer layer, especially if the latter has a greater thickness than the oxygen barrier.

For proper killing efficacy of insects contacting the outer side of the bag, the insecticide or insect repellent is configured for migrating in the insecticidal first polymer to the surface of the multilayer film for release thereof. In this case, the active agent is selected among insecticides and insect repellents that are capable of migrating in the insecticidal first polymer to the surface of the multilayer film for release of the active agent.

If the multilayer film is covered by one or more additional polymer layers, and the insecticide or insect repellent is desired to get to the outer surface of the bag, the active agent and the one or more additional polymer layers have to be selected such that active agent can migrate from the insecticidal first polymer layer through the one or more additional polymer layers and to the outer surface of the coated bag.

In order to repel rodents, a rodent repellent is potentially added to the first polymer and melt-incorporated therein or provided in an additional outer polymer layer or applied to the outer surface of the multilayer film as a coating, for example an impregnation.

For example, the method comprises extrusion-coating the web with the multilayer stream, wherein the extrusion coating comprises melting the insecticidal first polymer and the second polymer for the oxygen barrier in an extruder and co-extruding a multilayer molten stream with the two layers of first and second polymer, and optionally further layers, for example bonding layers. The multilayer film with the insecticidal first polymer layer and the oxygen barrier layer is then combined with the web while the multilayer film from the extruder is still in a molten state or at least partially molten state. Thus, the combination of the multilayer stream and the textile is done before the molten multilayer film from the extruder is solidified. Extrusion-coating has the advantage of a faster process with less energy consumption as compared to solidifying the multilayer stream first into a multilayer film, rolling the multilayer film onto a roller, and then bonding it with a molten bonding layer for lamination onto the web.

As an option to safeguard a tightly sealed coating, the method comprises providing the multilayer film with a width that is larger than the web in order for the multilayer films extending outside opposite edges of the flattened web, for example extending 2-5 mm on either side, and in order to fuse face-to-face along and outside both edges of the web, thus, providing a tight sealing along opposite edges of the flattened web. These additional method steps result in a crop storage bag, wherein the multilayer film, when the bag is in collapsed flattened condition, has a width that is larger than the width of the textile and extends a distance beyond opposite edges of the polymer textile, where the multilayer films from opposite sides of the flattened bag are fused face-to-face into a tight sealing of the bag. As an alternative, the multilayer film is provided on the textile with an overlap in order to provide proper sealing.

As already mentioned above, a good material for the oxygen barrier is EVOH, as it has a very low oxygen permeability and, thus, can be used efficiently even at low thickness of only a few microns, for example 3-10 microns, optionally 3-5 microns. Typically, the layer of the insecticidal first polymer, for example PE or PP, is thicker, for example in the range of 5-20 microns, optionally 10-15 microns For example, the multi-layer film is provided as a four-layer structure with an inner bonding layer towards the textile web on one side of the EVOH, and a second bonding layer on the opposite side of the EVOH for bonding the EVOH to the PE or PP.

Especially, the combination of an EVOH oxygen barrier with an insecticidal first polymer layer of a polyolefin, for example PE or PP has proven advantageous because the extrusion temperatures of the EVOH and the PE or PP are similar. Therefore, this combination of materials is good for co-extrusion of the multilayer film, potentially with some additional bonding layers, also called tie-layers, in between, for example on either side of the EVOH layer. For the combination of EVOH and PE or PP, useful tie-layers can be made from modified ethylene acrylate resins, for example as marketed under the name of Bynel® from the company DuPont®. Examples include Bynel® 22E757 or 21E830, the latter being an anhydride modified ethylene acrylate resin.

A co-extrusion temperature of in the range of 200-270° has proven useful for EVOH and PE or PP. A relatively low extrusion temperature is desired, in particular for insecticide or insect repellents that disintegrate easily and quickly at high temperatures. For a temperature sensitive pyrethroid, especially deltamethrin (DM), low temperatures are beneficial.

In contrast thereto, co-extrusion of a multilayer stream that contains a PA layer requires a higher temperature and, typically, also a different extruder configuration than the combination of EVOH and PE or PP due to different necessary extrusion characteristics. Therefore, the combination of EVOH with PE or PP is a good candidate for the oxygen barrier as well as insecticidal barrier when the insecticide is temperature sensitive.

An example of the multilayer film and potentially multilayer stream is a four-layer structure with an inner bonding layer towards the web on one side of the EVOH, and a second bonding layer on the opposite side of the EVOH for binding the EVOH to the insecticidal first polymer layer of PE or PP.

As the costs for EVOH are a factor of 10 higher than that of PE, it is of interest to keep the layer thickness of EVOH as thin as possible. From the perspective of an efficient oxygen barrier, this is possible, seeing that the permeability for oxygen is four orders of magnitude lower than for PE and PP. It is even two orders of magnitude lower than PA, which also been proposed as oxygen barrier in the prior art. This makes EVOH as very good candidate, especially in combination with PE or PP.

In test production, the following multilayer film has turned out to give good hermetic features despite low weight. An insecticidal first polymer layer of 15 micron thick PP was provided in the multilayer film in combination with a 5 micron thick EVOH that was sandwiched between two tie-layers of the same thickness. The total thickness was 30 microns, roughly corresponding to a weight of 30 g/m2. The insecticidal first polymer layer as an outer layer was provided as PP with 0.3% by weight DM, incorporated in the PP while in a molten state inside the extruder. The multilayer was extrusion coated onto a tubular PP flat-yarn woven textile having a weight of 55 g/m2.

These figures are exemplary only and can be varied in accordance with the desires size and stability as well as barrier efficiency of the product. For example, the concentration of the insecticide, optionally DM, is in the range of 0.1-10% by weight of the first polymer to which the insecticide is added.

For example, insecticide and/or insect repellent and potentially rodenticide are melt-incorporated in the first polymer of the insecticidal layer, which potentially is also an outer layer and facing the environment, unless covered by further outer polymer layers. In this case, the active agent is added to the first polymer while the first polymer is in a molten state. In some embodiments, the active agent is added to the extruder before or during extrusion. Alternatively, it is incorporated in a polymer masterbatch which is then melting a second time in the final extruder for the multilayer stream.

Optionally, as discussed above, the polymer and the insecticide and/or repellent and optional rodenticide are selected such that the active agent is capable of migrating from inside a bulk of the polymer to the surface of the polymer from which it is released.

In some embodiments, the migration of the active agent to the surface of the bag is hampered by a covering of the insecticidal layer with an additional outer polymer film layer, through which the insecticide is not migrating or only migrating at a small rate. Even this configuration, still yields protection against insects that try to penetrate the insecticidal layer on their way from outside the bag into the inner volume of the bag. An advantage of an additional outer polymer film layer, through which the insecticide is not migrating or only migrating at a small rate, is a reduction of the risk for health issues for humans caused by contact with insecticide on the outer surface of the bag.

An additional outer polymer film layer covering the insecticidal layer, where the additional outer polymer film layer has a blocking effect against migration of the active agent or has reduced migration properties, potentially, increases the lifetime of the insecticidal efficacy of the insecticidal layer because the insecticide is kept concentrated in the insecticidal layer underneath the additional outer polymer film layer. In this case, the insecticidal layer acts as a reservoir for the insecticide which is confined by the additional outer polymer film layer.

For example, the additional outer polymer film layer is a Biaxially Oriented PP (BOPP) film layer, potentially with a printing thereon. Such BOPP layer, typically, has reduced migration properties as compared to an extruded insecticidal PP layer due to the oriented polymer achieved by stretching the BOPP film in two directions. As the BOPP layer is not entirely blocking migration of pyrethroid, such as DM, it is useful not only for prolonging the lifetime of the insecticide but also for providing an insecticidal outer surface.

Optionally, the additional outer polymer film layer comprises a print. Such print comprises typically colors, pictures and/or alphanumeric information. For example, such information includes at least one of indicators and information about use, content, and/or producer of the bag.

Adding an additional outer polymer film layer can be done by multiple principles as described in the following.

In a first principle, a multilayer stream comprising an oxygen barrier polymer layer and insecticidal polymer layer is extrusion-coated onto the textile and solidified on the textile into a multilayer film, potentially with the oxygen barrier between the insecticidal layer and the textile. On top of the multilayer film, an additional outer polymer film layer is laminated, for example with an extruded bonding layer (tie layer) between the insecticidal first polymer layer and the additional outer polymer film layer.

In a second principle, a multilayer stream comprising an oxygen barrier layer and insecticidal first polymer layer is extruded and solidified into a multilayer film, which is later laminated onto the textile, for example with an extruded bonding layer (tie layer) between the multilayer film and the textile. On top of the multilayer film, an additional outer polymer film layer is laminated, for example with an extruded bonding layer (tie layer) between the insecticidal first polymer layer and the additional outer polymer film layer.

In a third principle, a multilayer stream, comprising an oxygen barrier layer and insecticidal first polymer layer, is extruded and used as a molten lamination bonding layer for the additional outer polymer film layer.

Typically, the additional outer polymer film layer is without insecticide or insect repellant. However, this is not strictly necessary, as the additional outer polymer film layer, optionally can be provided with an additional active agent, for example an additional insecticide and/or additional insect repellent. In some cases, it is advantageous to incorporate a rodenticide in the additional outer polymer film layer or coat a rodenticide onto the additional outer polymer film layer.

In further embodiments, an oxygen scavenger is provided inside the bag on or in the textile or even remote from the textile. The oxygen scavenger is potentially iron (Fe) based.

Optionally, the oxygen absorber is multi-functional, for example absorbing oxygen and releasing CO2. The oxygen absorber absorbs oxygen inside the bag, causing a faster suffocation and/or dehydration and also preventing mould to grow.

Examples of thermoplastic polymers for the textile are not only polyolefins, such as PE or PP, but also useful is polyethylene terephthalate (PET, polyester). Instead of a woven textile, a knitted or non-woven textile can also be used.

Examples of insecticides include pyrethrin and synthetic pyrethroids, for example deltamethrin and permethrin, and, alternatively, quinazolines, fiproles, pyroles, pyrazoles, neonicotinoids, carbamates. Concentrations in the range of 1 ppm and 10% are dependent on the insecticide and the desired release speed. To the insecticides can be added synergists, for example piperonyl butoxide (PBO). For deltamethrin, typical concentrations are in the range of 1-10 g/m2

Examples of repellents for the insect repellent source are oil of wintergreen, garlic, lime, citronella, black pepper, chili pepper, capsaicin & its derivatives, geraniol, catnip (*Nepeta lactone*), sandalwood, eugenol, Lippia multifloria (verbena), neem, cajeput (*Melaleuca leucadendron*), lemongrass (*Cymbopogon flexuosus*), cedar (*Cedrus deodora*), peppermint (*Mentha piperita*), java citronella (*Cymbopogon winterianus*), clove (*Syzygium aromaticum*), geranium (*Pelargonium graveolens*), rosemary (*Rosmarinus officinalis*), and sesame (*Sesamum indicum*).

Examples of rodent repellents are capsaicin and denatonium saccharide. Concentrations in the range of 1 ppm and 10% by weight of the polymer are dependent on the type of rodenticide and the desired strength and release speed.

In some embodiments, in order to prolong the efficacy of the insecticide and/or repellent, the active agent is provided on a support particle from which it is gradually released into the first polymer for migration to the surface of the first polymer. For example, such support particles have a sub-micron size or a micron size range of only a few microns, for example in the range of 1-5 microns. Typically, it is advantageous if they are smaller than the thickness of the first polymer layer. An example for support particles for the repellent/insecticide is nanoclay. Examples of nano-clays are attapulgite and montmorillonite. As an alternative to clay, micro-particles or nanoparticles are used, for example ground natural minerals or synthetic material, including silica, alumina and silicates. Examples of support particles for active agents include also kaolin, talc, chalk, quartz, carbon black, diatomaceous earth, calcite, marble, pumice, sepiolite and dolomite. Polymer based sponge-like particles can also function as the support for repellent.

Example of foodstuff includes cocoa, coffee, rice, beans, and grains, including maize, wheat, and barley.

Additives may be incorporated into the first polymer, for example UV protectors, colorants, optical brighteners, fillers, reinforcement fibres, flame retardants, anti-soiling agents, further biocides, and/or fragrance.

Aspects characterising the invention as disclosed above are therefore:

A method wherein the method comprises providing the multilayer film with an OTR less than 300 ccm/m2/day.

A method providing a sheet of textile (7) for the bag and either extrusion-coating a multilayer stream (8') of molten polymer onto the textile (7) and solidifying the stream into the multilayer film (8) or laminating the multilayer film (18) onto the textile.

A method providing the sheet of textile as an endless textile (7) web, flattening the textile (7) web into a flat two-layer textile web (15) with two opposite outer sides, and covering both outer sides with the multilayer film (8, 18) by the lamination or the extrusion-coating; wherein the insecticidal layer (9) is provided by a first thermoplastic polymer, and the oxygen barrier layer (10) is provided by a second thermoplastic polymer that is different from the first thermoplastic polymer; wherein the method comprises orienting the multilayer film (8, 18) with the oxygen barrier (10) between the textile (7) web and the insecticidal first polymer layer (9) for protecting the oxygen barrier (10) by the insecticidal first polymer layer (9).

A method providing the endless textile (7) web as a seamless tubular textile web and coating the multilayer film (8, 18) onto the web, and then cutting (21) the web into portions, each portion for one bag, and finally closing one end (4) of the portion for providing a bag (1) with a closed seam (22, 23, 24) only at the bottom (3) or finally closing opposite ends of the portion for providing a bag (1) with a closed seam (22, 23, 24) at the bottom (3) and at the top of the bag (1) but no seam on a side of the bag (1) from the bottom to the top.

A method providing the multilayer film (8, 18) with a width that is larger than the flattened web (15) in order for the multilayer films (8, 18) being fused on opposite sides of the web along and outside both edges (15A) of the web for providing a tight sealing along the web.

A method selecting the polymer for the at least one oxygen barrier polymer layer (10) among polyamide, PA, polyethylene terephthalate, PET, and polyvinyl alcohol, EVOH.

A method providing the multilayer film with a thickness of maximum 50 microns.

A method providing the oxygen barrier polymer layer (10) with a thickness in the range of 5-20 micron if the oxygen barrier polymer layer (10) is PA or PET, and with a thickness in the range of 3-10 micron if the oxygen barrier polymer layer (10) is EVOH.

A method providing the oxygen barrier (10) as a layer of ethylene vinyl alcohol, EVOH, and the insecticidal first polymer layer (9) as a layer of a polyethylene or a polypropylene, the insecticidal first polymer layer (9) having a greater thickness than the oxygen barrier layer (10).

A method providing the multilayer film (8) on the textile (7) as a four-layer structure with an inner bonding layer (11') towards the textile (7) web on one side of the EVOH oxygen barrier layer (10), and a second bonding layer (11) on the opposite side of the EVOH for bonding the EVOH to the insecticidal polyethylene or polypropylene first polymer layer (9).

A method providing the multilayer film (8) with a thickness in the range of 3-10 microns for either of the bonding layer (11, 11') and EVOH layer (10) and a thickness of the layer of the insecticidal first polymer (9) in the range of 12-20 microns.

A method co-extruding the multilayer stream film (8, 18) at a temperature in the range of 200-270°.

A method wherein the coating of the multilayer film (8) is provided as a lamination process that comprises melting the first and the second polymer in an extruder (17) and co-extruding the two layers (9, 10) as part of a multilayer stream (18'), cooling the multilayer stream (18') to form a multilayer film (18) and rolling the multilayer film (18) onto rollers (19); at the lamination location, rolling the multilayer film (18) from the roller and laminating it onto the textile (7); laminating an additional outer polymer film layer (25) onto the multilayer film (18), which comprises a surface print but no insecticide.

A method wherein the coating of the multilayer film (8) onto the textile (7) is provided as an extrusion-coating process that comprises melting the first and the second polymer in an extruder (17) and co-extruding the two layers (9, 10) as part of a multilayer stream (8'); and laminating an additional outer polymer film layer onto the textile (7) with the multilayer stream (8') as a bonding material between the additional outer polymer film layer and the textile (7), while the multilayer stream (8') is still in a partially or fully molten state; and then solidifying the multilayer stream (8') into a multilayer film (8) while on the textile (7) and covered by the additional outer polymer film layer (25).

A method selecting the insecticide for the insecticidal layer among insecticides that are capable of migrating in the first thermoplastic polymer.

A method wherein the insecticide is deltamethrin.

A hermetic insecticidal crop storage textile bag (1) with an inner side facing an inner volume and an opposite outer side facing the environment, wherein the bag (1) comprises a textile (7) sheet with an outer side covered with an extrusion-coated or laminated polymer multilayer film (8, 18), the film (8, 18) comprising an insecticidal layer (9) of a first thermoplastic polymer layer (9) containing an insecticide for preventing intrusion of insects into the bag by the insecticidal layer; wherein the multilayer film (8, 18) also comprises at least one oxygen barrier layer (10) made of a second thermoplastic polymer in order for the multilayer film (8) with the oxygen barrier layer (10) having an Oxygen Transmission Rate, OTR, sufficiently low for preventing breeding or killing potential insects inside the bag (1) when the bag (1) is in closed condition.

A textile bag wherein the OTR is less than 300 ccm/m2/day at atmospheric pressure.

A textile bag wherein the multilayer film (8) has a thickness of maximum 50 microns.

A textile bag wherein the second thermoplastic polymer is at polyamide, PA, polyethylene terephthalate, PET, or polyvinyl alcohol, EVOH.

A textile bag wherein the oxygen barrier polymer layer (10) has a thickness of 5-20 micron if the oxygen barrier polymer layer (10) is PA or PET, and a thickness of 3-10 micron if the oxygen barrier polymer layer (10) is EVOH.

A textile bag wherein the oxygen barrier layer (10) is between the textile (7) web and the insecticidal first polymer layer (9) for protecting the oxygen barrier layer (10) by the insecticidal first polymer layer (9); wherein the insecticidal first polymer have melt-incorporated therein the insecticide.

A textile bag wherein the insecticide is capable of migrating in the first thermoplastic polymer. A textile bag wherein the multilayer film (8), when the textile (7) is in collapsed flattened condition (15), has a width that is larger than the width of the textile (7) and extends a distance beyond opposite edges (15A) of the polymer textile, where the multilayer film (8) is fused into a tight sealing of the bag (8) along the opposite edges (15A).

A textile bag wherein the bag (1) comprises a tubular polymer textile (7) with a seam (22, 23, 24) only at the bottom (3) or with a seam only at the bottom (3) and the top.

A textile bag wherein the textile polymer is PET and second polymer is PET and wherein the insecticidal layer is made of a polyolefin.

A textile bag wherein the first polymer is PE or PP and the second polymer is EVOH, wherein the insecticidal first polymer layer (9) has a greater thickness than the EVOH oxygen barrier layer (10).

A textile bag wherein the multilayer film (8) is a four-layer structure with an inner bonding layer (11') towards the textile (7) web on one side of the EVOH, and a second bonding layer (11) on the opposite side of the EVOH for bonding the EVOH to the PE or PP.

A textile bag wherein the multilayer film (8) is covered by an additional outer polymer film layer (25) comprising a surface print but no insecticide.

A textile bag wherein the additional outer polymer film layer (25) is a Biaxially-Oriented PolyPropylene, BOPP, film.

A textile bag wherein the insecticide is deltamethrin.

Use of a bag as described above for storage of grains.

The examples are for illustrative purpose and not limiting the invention unless defined in the patent claims.

SHORT DESCRIPTION OF THE DRAWINGS

The invention will be explained in more detail with reference to the drawing, where FIG. 1 illustrates a textile bag with a hermetic insecticidal coating;

FIG. 2 illustrates an example of production process for a seamless tubular textile, FIG. 3 illustrates an example of a extrusion-coating process, FIG. 4 illustrates the extrusion of a multilayer film and its rolling onto a roller (FIG. 4a) and an example of a lamination process (FIG. 4b);

DETAILED DESCRIPTION/PREFERRED EMBODIMENT

Figure 1:
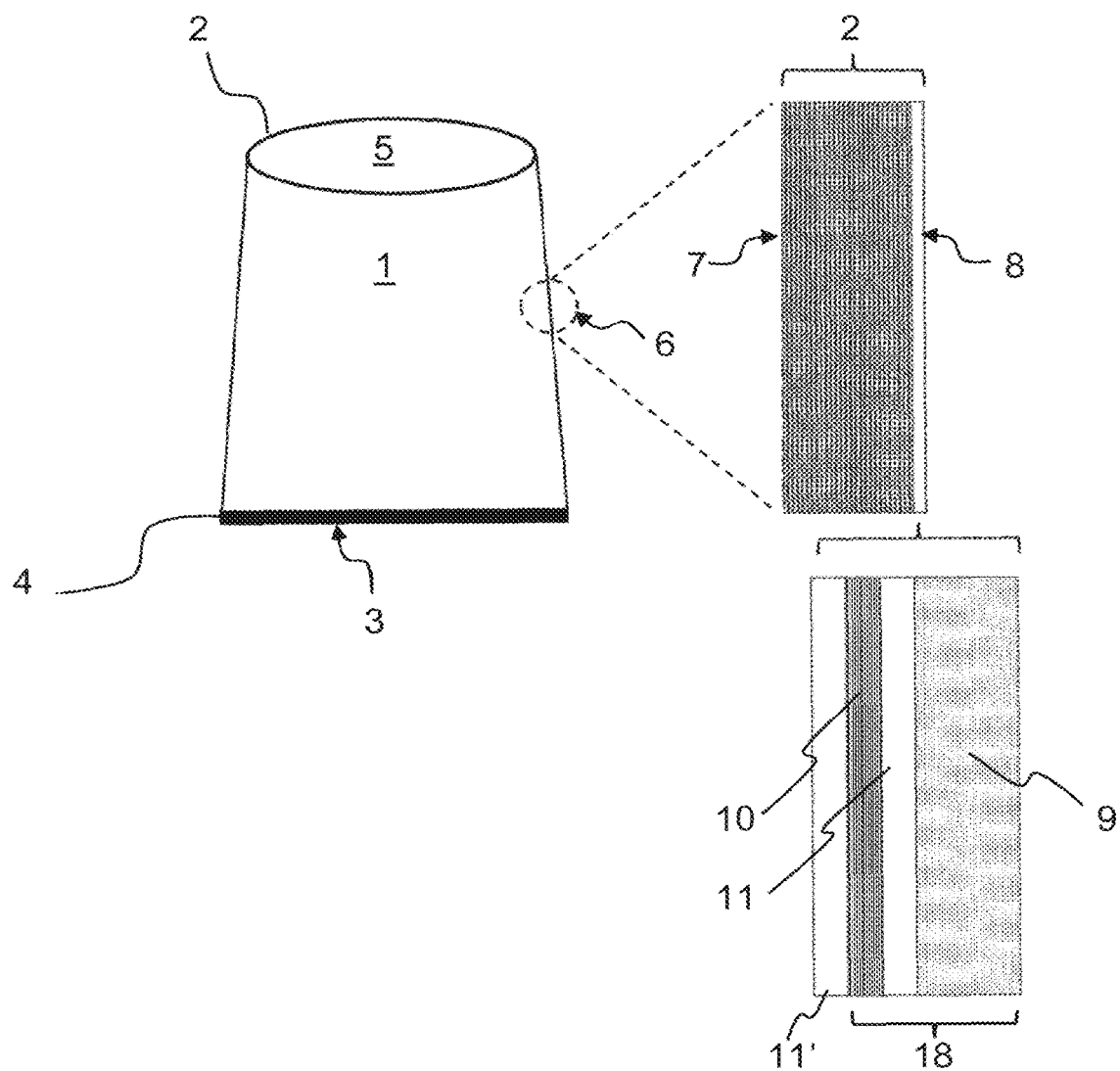

FIG. 1 illustrates a bag 1 with a tubular polymer sheet material 2 that has a closed bottom 3. For example, the bottom 3 has been provided by flattening the tubular material 2 and closing an end part 4 of it, for example by welding, gluing, sewing, or a combination of one or more of these. The bag 1 has an upward opening 5 that is open and ready for filling foodstuff into the bag 1, for example crop products, such as grains or rice.

A cross section 6 is shown enlarged to the right of the bag 1, although, not to scale. The sheet material 2 of the bag 1 comprises a textile 7 and a thermoplastic polymer multilayer film 8 coated onto the outer side of the textile 7. As the textile 7 is tubular, coating the outer side of the tubular textile 7 is much easier than coating the inside. This will become more apparent below when examples are given for production processes.

For example, the textile 7 is a weave of the type where flat yarns are interwoven. Such flat yarns are typically produced by extruding a thermoplastic polymer film, typically stretching the film for orienting the polymer for increased strength, and cutting the film into narrow strips, for example with a width in the range of 3-5 mm, which are then rolled onto bobbins from which they are later used for weaving.

Examples of polymer materials are polyolefins, for example polyethylene (PE) or polypropylene (PP). Examples of PE include High Density PolyEthylene (HDPE), Low Density PolyEthylene (LDPE), or Linear Low Density PolyEthylene (LLDPE), and mixtures thereof. Alternatives include polyester (PolyEthylene Terephtalate, PET). The list is not exhaustive.

In FIG. 1, also an example of a coating is illustrated, where the coating is a multilayer polymer film 8 with an outer insecticidal layer 9 that also add strength to the bag 1. Useful polymers for the insecticidal layer 9 are polyolefins, optionally PP and PE, for example LDPE or LLDPE.

Other layers of the multilayer film 8 comprise an oxygen barrier 10, for example ethylene vinyl alcohol (EVOH). An alternative is polyamide (PA). However, when using PP or PE for the insecticidal first polymer layer, EVOH has some advantages in the production process over PA which will be described in more detail below. For better bonding, the oxygen barrier 10 is, optionally, sandwiched between bonding layers 11, 11', also called tie-layers. Further additional layers are possible, however, the simple four layer structure has proven useful and sufficient.

FIG. 2 illustrates a possible production process for the textile 7. In a weaving station 12, flat yarns 13 are supplied from a plurality of bobbins 14 for weaving of the tubular woven textile 7. The tubular textile 7 is collapsed into a double layered flattened structure 15. A typical material for the flat yarns is a polyolefin, for example PP or PE, although, also PET is a good candidate. Typically, the textile 7 is provided at a separate location than the coating and, therefore, rolled onto rollers 16, which are then transported to the coating location and unrolled as needed. As an alternative to a woven textile 7, a knitted or non-woven tubular textile is also a possibility.

In some embodiments, for the production, the multilayer film is co-extruded as a multilayer stream and cooled for solidification, potentially stretched for orientation of the polymer, and then rolled onto rollers. In a subsequent step, the film is rolled off the rollers and laminated onto the weave.

In order to shortcut the process and for increased adhesion between the textile 7 and the multilayer film 8, the multilayer film 8 is co-extruded as a multilayer stream and, while the film 8 from the extruder is still in a molten or partially molten state, laid onto the textile 7 where it solidifies. This process is typically called extrusion-coating. This method is simpler in that it avoids a solidification process of the multilayer film 8 after co-extrusion, the rolling of the multilayer film 8 onto rollers, possible transport of the rollers, and a subsequent lamination process.

FIG. 3 illustrates such extrusion-coating process as part of an exemplified production. In more detail, the production is as follows. For the coating, a multilayer co-extruder system 17 is provided, which in the exemplified case comprises three screw-extruders 17A, 17B, 17C. One extruder 17A is used for the two tie layers 11, 11', one extruder 17B for the polymer of the oxygen barrier 10, for example EVOH, and one extruder 17C containing the polymer for the insecticidal first polymer layer 9, for example PP or PE. The molten polymers from the three extruders 17A, 17B, 17C are combined by co-extrusion into a molten multilayer stream 8' of the type as illustrated in FIG. 1 for the multilayer film 8 without mixing of the polymers. Thus, the extruded multilayer stream 8' keeps its multilayer structure until it in molten or partially molten state is laid down on the flattened structure 15 as a coating, bonded to the textile 7, and solidified as a multilayer film 8 on the textile 7. In order to coat both sides of the flattened structure 15, a similar extruder system 17 is provided further downstream. The final material 2 is a tubular woven textile 7 with a multilayer film 8 covering the outer surface of the textile 7.

Optionally, while the multilayer stream 8' is still in molten or partially molten state, it can be used as a bonding layer for one or more additional outer polymer layers 25, for example a printed BOPP layer.

Alternatively, such one or more additional outer polymer layers 25 are laminated onto the final multilayer film 8 in a subsequent step, for example with an additional bonding layer in between. This method can also be used in connection with the embodiment of FIG. 4b, although not illustrated.

FIG. 4a illustrates an alternative process, in which a multilayer film 18 is extruded as a multilayer stream 18', potentially stretched for orientation of the polymer, and after cooling and solidification in a cooling step 20, rolled onto rollers 19. As illustrated in FIG. 1, the multilayer film 18 in FIG. 4a does not comprise the bonding layer 11' that is used to bond the multilayer film 18 of FIG. 4a to the textile 7.

FIG. 4b illustrates a subsequent step, in which the multilayer film 18 without the inner bonding layer 11' is rolled off the rollers 19 and laminated onto the textile 7 by adding the still molten or partially molten bonding layer 11' from the extruder 17' between the multilayer film 18 and the flattened structure 15 of the textile 7. Also, this process is used on both sides of the flattened structure 15, which comprises two layers of textile 7.

Optionally, an outer polymer layer, for example a printed BOPP layer, or several layers is/are laminated onto the textile (7) in a subsequent step after having laminated the multilayer film (8) onto the textile.

Figure 5A:
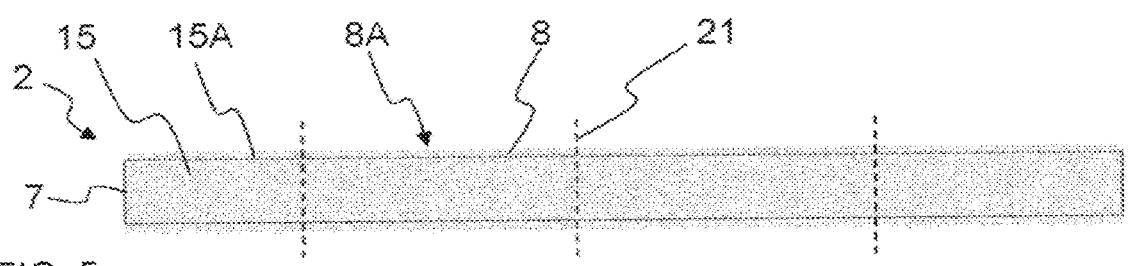
FIG. 5 illustrates a production process for forming a bag, where the tubular bag material is cut (FIG. 5a) and the cut ends are folded and fixed for providing a closed bottom (FIG. 5b) or alternatively a folded end-sealing strip added (FIG. 5c), or as a further alternative the ends are sealed by a welding (FIG. 5d).

FIG. 5a illustrates the textile 7 with the multilayer film 8 from a top view. It is observed that the multilayer film 8 comprises an overlay 8A that extends beyond the edge 15A of the flatted structure 15 of the textile 7. This makes sure that there is a tight bonding of the multilayer film 8 along and around the textile 7. The flattened structure 15 is cut along predetermined transverse paths 21.

Figure 5B:
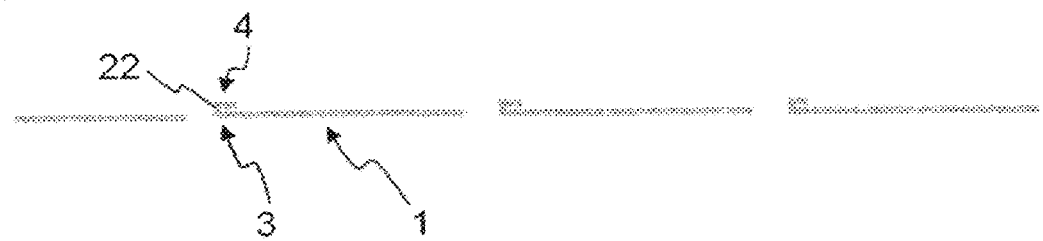

FIG. 5b illustrates one way of closing the bottom 3, where a fold 22 is provided at the end part 4 which is fixed for providing a sealed bottom 3 of the bag 1.

In the case of the outermost film layer 9 being a polyolefin, especially PE or PP, it is ultrasound or heat weldable for a proper sealing. Alternative or additional sealing includes sewing or gluing.

Figure 5C:

FIG. 5c illustrates an alternative closure of the end part 4 where a sealing strip 23 is folded over the bottom part of the sheet material 2 across the entire sheet material 2 and then sealed against the polymer sheet material 2 of the bag 1 in order to provide a sealed bottom 3, for example by at least one of welding, gluing and sewing. The sealing strip 21 is typically a polymer film, for example PE or PP, which is weldable against at least the outer first polymer layer 9 of the multilayer film 8.

Figure 5D:
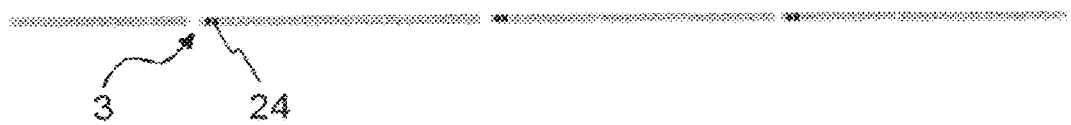

FIG. 5d illustrates an even further closure of the end part 4, wherein a welding 24, for example ultrasonic welding or heat welding, is provided through and across the double layer flattened structure 15, where the welding fuses the two textile 7 layers of the double layer flattened structure 15, typically including the multilayer film 8.

Optionally, the active agent in the outer insecticidal layer 9 is added to the extruder prior to extrusion of the polymer.

Examples of insecticides include pyrethroids, optionally permethrin or deltamethrin (DM).

With respect to the oxygen barrier 10, EVOH is advantageous, when combined in the multilayer film 8 with an insecticidal layer 9 of PE or PP because the necessary extrusion temperatures for EVOH and PA or PP are similar. In contrast thereto, PA has a higher extrusion temperature, which makes the process not only more difficult, but which also increases the temperature of the PE or PP, which can be detrimental for the insecticide in such layers. Especially, DM is heat sensitive.

For example, extrusion temperatures of the PE or PP multilayer film with EVOH is in the range of 250-270° C. in order to provide good adhesion to the textile 7, for example PE or PP weave. An improvement has been found by heating the textile 7 to a temperature of 70-80 degrees so that the cooling of the extruded multilayer stream 8' into a multilayer film 8 is slowed down. In this case, the extrusion temperature can be lowered to 220-250° C. for PP as the insecticidal first polymer layer or to 200-230° C. for PE, optionally LDPE. Both ranges are suitable for EVOH as well. The lower temperature is beneficial for insecticide in the insecticidal first polymer layer, especially pyrethroids, such as DM, which is heat sensitive and quickly degrades at such elevated temperatures. It should be noticed that such temperatures are not suitable for PA extrusion, as PA need a much higher extrusion temperature, why EVOH also from this standpoint is superior to PA as an oxygen barrier when combined with PE or PP.

In experiments, layer thicknesses of 5 microns for the bonding tie layers and EVOH layers, respectively, and 15 microns for the outer insecticidal layer were found practical. This is remarkable, and it must be stressed that a 5 micron EVOH layer cannot be handled properly in isolation, why the stabilizing and strength-giving multilayer film 8 with the thicker outer insecticidal layer 9 is highly advantageous. There is an interest to keep the layer thickness small in order to minimize weight and production costs. On the other hand, the multilayer film 8 cannot be made too thin, as the film stability is then lost. For extrusion coating as well as for lamination, such multilayers have proven feasible.

In successful experiments, the overall weight of the film 8 was about 30 g/m2, which is much less than the thickness of 60 micron and weight of 60 g/m2 of the prior art liner that is inserted into an outer strength giving woven bag. By incorporating insecticide and/or insect repellent and optionally rodenticide in the outer insecticidal layer 9, an efficient barrier was provided against insects and potentially rodents which are attempting to make their way through the bag material 2.

When providing the textile 7 as a seamless tubular web, the stability is higher than a bag with a seam along the side of the bag. Furthermore, the coating adds to the stability of the textile, why also the textile could be made thinner than in the prior art where the complete bag is provided as a double bag with an outer strength-giving textile bag and an oxygen barrier as an inner film bag.

As already mentioned, reduction of weight and cost while having high and long term stability are important features for this type of product. Accordingly, also from this perspective, the extrusion-coated textile proved synergistic effects by the production method.

REFERENCE NUMBERS 1 bag
2 sheet material
3 bottom of bag 1
4 end part of tubular weave 7

5 upward opening of bag 1
6 cross section
7 textile, for example tubular polymer weave
8 multilayer film
8' multilayer stream
8A overlay of multilayer film 8
9 insecticidal first polymer layer
10 second polymer oxygen (O2) barrier
11 bonding layer between O2 barrier 10 and insecticidal layer 9
11' bonding layer between O2 barrier 10 and textile 7
12 weaving station
13 flat yarns
14 bobbins
15 flattened weave structure
16 roll of textile
17 multilayer extruder system
17A extruder for tie layers
17B extruder for oxygen barrier 10
17C extruder for insecticidal layer 9
17' extruder for bonding layer 11'
18 multilayer film for lamination
18' multilayer stream of multilayer film 18 for lamination
19 roller of multilayer film 18 for lamination
20 cooling area for multilayer stream 18'
21 transverse path of cut
22 bent part at bottom 3
23 bottom sealing strip
24 welding, illustrated as a double line welding, for example ultrasonic
25 additional outer polymer layer(s)

The invention claimed is:

1. A method for producing a bag (1), the bag comprising an inner side facing an inner volume and an opposite outer side facing the environment, wherein the method comprises providing the bag (1) with a textile layer forming the inner side of the bag, wherein the textile layer comprises a textile that is woven, knitted, or non-woven, and providing the bag (1) with a polymer multilayer film (8, 18) only on the outer side; wherein the polymer multilayer film (8) comprises an insecticidal polymer layer (9) in which an insecticide is melt-incorporated for preventing intrusion of insects into the bag (1) by the insecticidal polymer layer (9); wherein the method comprises including at least one oxygen barrier polymer layer (10) in the polymer multilayer film (8, 18) for providing an Oxygen Transmission Rate, OTR, through the multilayer film (8) which prevents breeding of insects and/or sterilizes and/or kills insects inside the bag (1) when the bag (1) is in closed condition wherein the polymer multilayer film (8) is provided as a lamination process that comprises melting a first and a second polymer in an extruder (17) and co-extruding the two layers (9, 10) as part of a multilayer stream (18'), cooling the multilayer stream (18') to form a multilayer film (18) and rolling the multilayer film (18) onto rollers (19); at a lamination location, rolling the multilayer film (18) from the roller and laminating it onto a sheet of textile (7); laminating an additional outer polymer film layer (25) onto the polymer multilayer film (18), which comprises a surface print but no insecticide, or as an extrusion-coating process that comprises melting a first and a second polymer in an extruder (17) and co extruding the two layers (9, 10) as part of a multilayer stream (8'); and laminating an additional outer polymer film layer onto a sheet of textile (7) with the multilayer stream (8') as a bonding material between an additional outer polymer film layer and the sheet of textile (7), while the multilayer stream (8') is still in a partially or fully molten state; and then solidifying the multilayer stream (8') into a multilayer film (8) while on the sheet of textile (7) and covered by the additional outer polymer film layer (25).

2. The method according to claim 1, wherein the method comprises providing the polymer multilayer film with an OTR less than 300 ccm/m2/day.

3. The method according to claim 2, wherein the method comprises providing a sheet of textile as an endless textile (7) web, flattening the endless textile (7) web into a flat two-layer textile web (15) with two opposite outer sides, and covering both outer sides with the polymer multilayer film (8, 18) by lamination or extrusion-coating; wherein an insecticidal layer (9) is provided by a first thermoplastic polymer, and an oxygen barrier layer (10) is provided by a second thermoplastic polymer that is different from the first thermoplastic polymer; wherein the method comprises orienting the polymer multilayer film (8, 18) with an oxygen barrier (10) between the textile (7) web and the insecticidal first polymer layer (9) for protecting the oxygen barrier layer (10) by the insecticidal first polymer layer (9).

4. The method according to claim 1, wherein the method comprises providing an endless textile (7) web as a seamless tubular textile web and coating a multilayer film (8, 18) onto the endless textile web, and then cutting (21) the endless textile web into portions, each portion for one bag, and finally closing one end (4) of the portion for providing a bag (1) with a closed seam (22, 23, 24) to form a closed bottom (3) or finally closing opposite ends of the portion for providing a bag (1) with a closed seam (22, 23, 24) defining a bottom (3) and a top of the bag (1) but no seam on a side of the bag (1) from the bottom to the top.

5. The method according to claim 4, wherein the method comprises providing the polymer multilayer film (8, 18) with a width that is larger than the flattened web (15) in order for the polymer multilayer film (8, 18) being fused on opposite sides of the flattened web along and outside both edges (15A) of the flattened web for providing a tight sealing along the flattened web.

6. The method according to claim 1, wherein the method comprises providing an oxygen barrier layer (10) as a layer of ethylene vinyl alcohol, EVOH, and the insecticidal polymer layer (9) as a layer of a polyethylene or a polypropylene, the insecticidal polymer layer (9) having a greater thickness than the oxygen barrier layer (10).

7. The method according to claim 1, wherein the method comprises selecting an insecticide for the insecticidal polymer layer from among insecticides that are capable of migrating in the first polymer.

8. The method according to claim 1, wherein the insecticide is deltamethrin or permethrin.

* * * * *